(12) United States Patent
Zhu

(10) Patent No.: US 12,380,775 B2
(45) Date of Patent: Aug. 5, 2025

(54) ADJUSTMENT METHOD AND APPARATUS FOR DRIVING WAVEFORM, ELECTRONIC DEVICE, AND READABLE STORAGE MEDIUM

(71) Applicant: HONOR DEVICE CO., LTD., Shenzhen (CN)

(72) Inventor: Jianwei Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/797,935

(22) PCT Filed: Mar. 23, 2022

(86) PCT No.: PCT/CN2022/082414
§ 371 (c)(1),
(2) Date: Aug. 5, 2022

(87) PCT Pub. No.: WO2022/242299
PCT Pub. Date: Nov. 24, 2022

(65) Prior Publication Data
US 2024/0212463 A1 Jun. 27, 2024

(30) Foreign Application Priority Data

May 20, 2021 (CN) .......................... 202110552996.7
Jun. 16, 2021 (CN) .......................... 202110668274.8

(51) Int. Cl.
*G08B 6/00* (2006.01)
*G06F 3/04847* (2022.01)

(52) U.S. Cl.
CPC ........... *G08B 6/00* (2013.01); *G06F 3/04847* (2013.01)

(58) Field of Classification Search
None
See application file for complete search history.

(56) References Cited

U.S. PATENT DOCUMENTS

| 8,412,282 B2 | 4/2013 | Yoon et al. |
| 9,245,429 B2 | 1/2016 | Jamal et al. |
| (Continued) | | |

FOREIGN PATENT DOCUMENTS

| CN | 101867647 A | 10/2010 |
| CN | 105322842 A | 2/2016 |
| (Continued) | | |

OTHER PUBLICATIONS

Ryu et al., "posVibEditor: Graphical authoring tool of vibrotactile patterns," 2008 IEEE International Workshop on Haptic Audio visual Environments and Games, Oct. 18, 2008, 6 pages.

*Primary Examiner* — Muhammad Adnan
(74) *Attorney, Agent, or Firm* — Fish & Richardson P.C.

(57) ABSTRACT

Embodiments of this application disclose an adjustment method and apparatus for a driving waveform, a device, and a readable storage medium. In response to an interruption event, a vibration description file corresponding to the interruption event is obtained. A vibration parameter in the vibration description file corresponding to the interruption event is used to adjust a driving waveform, so that vibration of a linear motor is adapted to the interruption event, and a vibration sensation is adjusted following scenario changes, so that a vibration function is expanded, and the user is further provided with better vibration sensation experience.

17 Claims, 8 Drawing Sheets

(56) References Cited

U.S. PATENT DOCUMENTS

| | | | |
|---|---|---|---|
| 9,513,704 B2* | 12/2016 | Heubel | G06F 3/04883 |
| 9,520,036 B1* | 12/2016 | Buuck | G06F 3/016 |
| 9,678,592 B2* | 6/2017 | Takeuchi | G06F 3/041 |
| 10,026,276 B2 | 7/2018 | Rank et al. | |
| 10,394,326 B2* | 8/2019 | Ono | G06F 3/0416 |
| 10,965,803 B2* | 3/2021 | Li | G08B 6/00 |
| 11,460,923 B2* | 10/2022 | Lee | G06F 3/043 |
| 2005/0237011 A1 | 10/2005 | Woods et al. | |
| 2014/0002346 A1* | 1/2014 | Weddle | G06F 3/016 |
| | | | 345/156 |
| 2014/0078102 A1* | 3/2014 | Araki | G06F 3/04815 |
| | | | 345/174 |
| 2016/0064002 A1* | 3/2016 | Kim | G01S 3/8083 |
| | | | 704/246 |
| 2016/0139671 A1* | 5/2016 | Jun | G06F 3/04886 |
| | | | 715/702 |
| 2016/0246265 A1* | 8/2016 | An | H02J 50/12 |
| 2016/0260431 A1* | 9/2016 | Newendorp | G10L 15/22 |
| 2017/0278480 A1* | 9/2017 | Sung | G06F 3/013 |
| 2017/0322648 A1* | 11/2017 | Jeong | G06F 3/043 |
| 2018/0069955 A1* | 3/2018 | Kim | G04G 9/06 |
| 2018/0301128 A1* | 10/2018 | Lee | G06F 1/163 |
| 2018/0348867 A1* | 12/2018 | Mujibiya | G06F 3/016 |
| 2019/0094970 A1* | 3/2019 | Van Ausdall | G06F 3/016 |
| 2019/0311590 A1* | 10/2019 | Doy | H03F 3/183 |
| 2019/0391653 A1 | 12/2019 | Ono et al. | |
| 2020/0044592 A1* | 2/2020 | Li | H02P 23/0077 |
| 2020/0111334 A1* | 4/2020 | Moussette | G06F 3/016 |
| 2020/0212832 A1 | 7/2020 | Deng et al. | |
| 2020/0230647 A1* | 7/2020 | Shim | H04M 19/047 |
| 2021/0110841 A1 | 4/2021 | Maximilian et al. | |
| 2021/0319677 A1* | 10/2021 | Wang | B06B 1/0261 |
| 2024/0186920 A1* | 6/2024 | Zhu | G06F 3/0488 |

FOREIGN PATENT DOCUMENTS

| | | |
|---|---|---|
| CN | 106059440 A | 10/2016 |
| CN | 106133650 A | 11/2016 |
| CN | 108881615 A | 11/2018 |
| CN | 109144606 A | 1/2019 |
| CN | 109887528 A | 6/2019 |
| CN | 110707982 A | 1/2020 |
| CN | 111030412 A | 4/2020 |
| CN | 111309150 A | 6/2020 |
| CN | 111552377 A | 8/2020 |
| CN | 111966211 A | 11/2020 |
| CN | 112269895 A | 1/2021 |
| CN | 112506341 A | 3/2021 |
| EP | 2743800 A2 | 6/2014 |
| EP | 2846221 A1 | 3/2015 |
| KR | 20050102991 A | 10/2005 |
| WO | 2013134388 A1 | 9/2013 |
| WO | 2018223535 A1 | 12/2018 |

\* cited by examiner

ADJUSTMENT METHOD AND APPARATUS FOR DRIVING WAVEFORM, ELECTRONIC DEVICE, AND READABLE STORAGE MEDIUM

CROSS-REFERENCE TO RELATED APPLICATIONS

This application is a national stage of International Application No. PCT/CN2022/082414, filed on Mar. 23, 2022, which claims priority to Chinese Patent application Ser. No. 20/211,0552996.7, filed on May 20, 2021, and Chinese Patent Application No. 202110668274.8, filed on Jun. 16, 2021.The disclosures of the aforementioned applications are hereby incorporated by reference in their entireties.

TECHNICAL FIELD

This application relates to the field of electronic information technologies, and in particular, to an adjustment method and apparatus for a driving waveform, an electronic device, and a readable storage medium.

BACKGROUND

A linear motor is a commonly used device for implementing vibration in an electronic device. Because stroke directions are different, linear motors may be basically categorized into an X-axis linear motor and a Z-axis linear motor.

Although currently vibration can be combined with different service scenarios to provide an electronic device with some new functions, it is still possible to further develop vibration-related functions.

SUMMARY

This application provides an adjustment method and apparatus for a vibration waveform of a linear motor, to resolve the problem of how to improve the vibration effect of a linear motor.

To achieve the foregoing objective, this application provides the following technical solutions.

A first aspect of this application provides an adjustment method for a driving waveform, applicable to an electronic device, the electronic device including a linear motor, the method including the following steps: in response to an interruption event, obtaining a vibration description file corresponding to the interruption event, the description file being used for describing a vibration parameter; and adjusting a driving waveform by using the vibration parameter, to cause vibration of the linear motor to be adapted to the interruption event, so that a vibration sensation is adjusted following scenario changes, thereby providing a user with better vibration sensation experience, and further expanding a vibration function.

Optionally, the adjusting a driving waveform by using the vibration parameter includes: comparing values of a vibration parameter described in a static description file and a vibration parameter described in a dynamic description file to obtain a difference, where in a case that the interruption event does not occur, the static description file being used for controlling the linear motor to vibrate, the dynamic description file being the vibration description file corresponding to the interruption event: and generating an adjustment coefficient according to the difference; and adjusting, by using the adjustment coefficient, a driving waveform converted from the static description file. The driving waveform is adjusted by using the difference between the values of the vibration parameter described in the static description file and the vibration parameter described in the dynamic description file, so that the accuracy is high, the implementation is easy, and a manner of adjusting the adjustment coefficient is easy to operate.

Optionally, a type of the vibration parameter described in the dynamic description file is a subset of a type of the vibration parameter described in the static description file to reduce the cost of comparison.

Optionally, an obtaining process of the static description file includes: obtaining a waveform according to vibration characteristics of an application, or selecting a waveform from a pre-configured scenario vibration sensation waveform to display a first basic waveform: and generating the static description file in response to an adjustment instruction for the first basic waveform. Because a basic waveform is provided first, the user can obtain the required vibration description file based on the basic waveform, so that the efficiency is further improved and a technical threshold for the user to obtain the vibration description file is lowered.

Optionally, the obtaining a vibration description file corresponding to the interruption event includes: receiving and displaying a second basic waveform from an external source: and generating the vibration description file corresponding to the interruption event in response to an adjustment instruction for the second basic waveform. The dynamic description file may also be visualized and adjusted, so that greater possibility and flexibility for subsequent dynamic adjustment of the vibration of the linear motor are provided.

Optionally, the adjustment instruction instructs to perform at least one of adjusting a parameter of the waveform or superimposing of a plurality of waveforms.

Optionally, the method further includes: displaying prompt information in a case that a value of the parameter of the adjusted waveform exceeds an adjustment limit, the prompt information being used for prompting that an adjustment exceeds the adjustment limit to protect a to-be-controlled linear motor from damage.

A second aspect of this application provides an adjustment apparatus for a driving waveform, applicable to an electronic device, the electronic device including a linear motor, the method including an obtaining unit and an adjustment unit. The obtaining unit is configured to obtain, in response to an interruption event, a vibration description file that corresponds to the interruption event and is used for describing a vibration parameter. The adjustment unit is configured to adjust a driving waveform by using the vibration parameter. The user is provided with better vibration sensation experience, and a vibration function is further expanded.

Optionally, that the adjustment unit is configured to adjust a driving waveform by using the vibration parameter includes: that the adjustment unit is further configured to compare values of a vibration parameter described in a static description file and a vibration parameter described in a dynamic description file to obtain a difference, where in a case that the interruption event does not occur, the static description file being used for controlling the linear motor to vibrate, the dynamic description file being the vibration description file corresponding to the interruption event: and generating an adjustment coefficient according to the difference: and adjusting, by using the adjustment coefficient, a driving waveform converted from the static description file, so that the adjustment accuracy is high and operations are facilitated.

Optionally, a type of the vibration parameter described in the dynamic description file is a subset of a type of the vibration parameter described in the static description file to reduce the cost of comparison.

Optionally, the obtaining unit is further configured to: obtain a waveform according to vibration characteristics of an application, or select a waveform from a pre-configured scenario vibration sensation waveform to display a first basic waveform; and generate the static description file in response to an adjustment instruction for the first basic waveform, so that the efficiency can be improved and a technical threshold for the user to obtain the vibration description file is lowered.

Optionally, that the obtaining unit is configured to obtain a vibration description file corresponding to the interruption event includes: that the obtaining unit is further configured to receive and display a second basic waveform from an external source: and generating the vibration description file corresponding to the interruption event in response to an adjustment instruction for the second basic waveform. The dynamic description file may also be visualized and adjusted, so that greater possibility and flexibility for subsequent dynamic adjustment of the vibration of the linear motor are provided.

Optionally, the adjustment instruction instructs to perform at least one of adjusting a parameter of the waveform or superimposing of a plurality of waveforms.

Optionally, the apparatus further includes: a prompt unit, configured to display prompt information in a case that a value of the parameter of the adjusted waveform exceeds an adjustment limit, the prompt information being used for prompting that an adjustment exceeds the adjustment limit to protect the to-be-controlled linear motor from damage.

A third aspect of this application provides an electronic device, including: one or more processors: and a memory, storing a program, the program, when executed by the one or more processors, causing the one or more processors to implement the adjustment method for a vibration waveform of a linear motor as described in the first aspect to improve the vibration effect of a linear motor.

A fourth aspect of this application provides a readable storage medium, storing a computer program, the computer program, when executed by a processor, implementing the adjustment method for a vibration waveform of a linear motor as described in the first aspect to improve the vibration effect of a linear motor.

BRIEF DESCRIPTION OF DRAWINGS

FIG. 3b is an example flowchart of to-be-achieved functions of the software architecture shown in FIG. 3a:

DESCRIPTION OF EMBODIMENTS

In the specification, claims, and accompanying drawings of this application, the terms "first", "second", "third", and so on are intended to distinguish between different objects but do not indicate a particular order.

In this application, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include one . . . " does not exclude other same elements existing in the process, the method, the article, or the device that includes the element.

A linear motor is arranged in an electronic device, and is configured to enable the electronic device to output a vibration sensation through vibration. In different scenarios of the electronic device, the linear motor is controlled to vibrate to generate different vibration effects, so that the user perceives the vibration sensation, and to prompt the user or give feedback to the user's operation. Details are as follows:

1. Different service scenarios (for example, a time prompt, Information receiving, an incoming call, an alarm clock, and a game) may correspond to different vibration effects.

2. As feedback to touch. For example, touch operations performed on different applications (for example, photo taking and audio playing) may correspond to different vibration effects. Touch operations performed on different areas of the display screen may also correspond to different vibration effects.

Figure 1A:
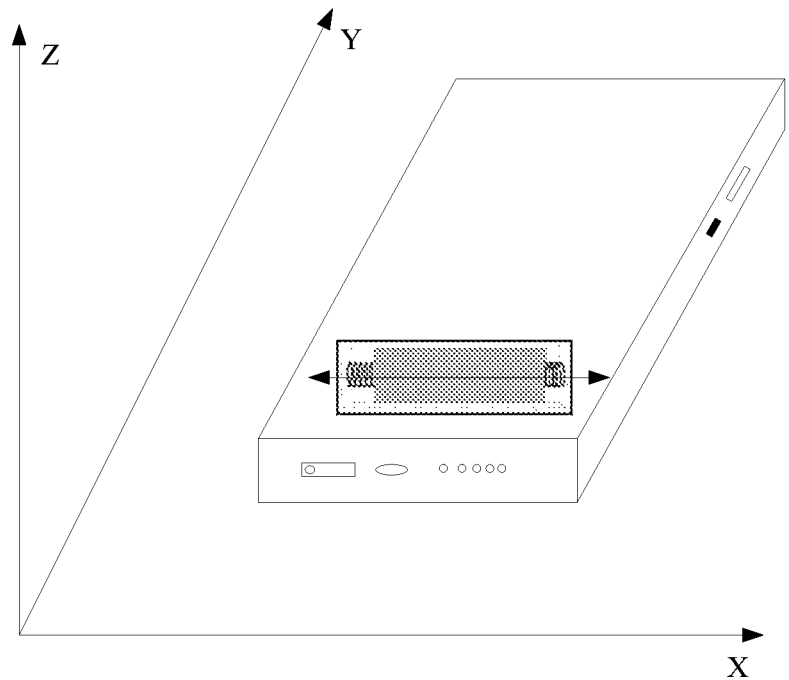
FIG. 1a is a diagram of the structure and an application example of an X-axis linear motor.
Figure 1B:
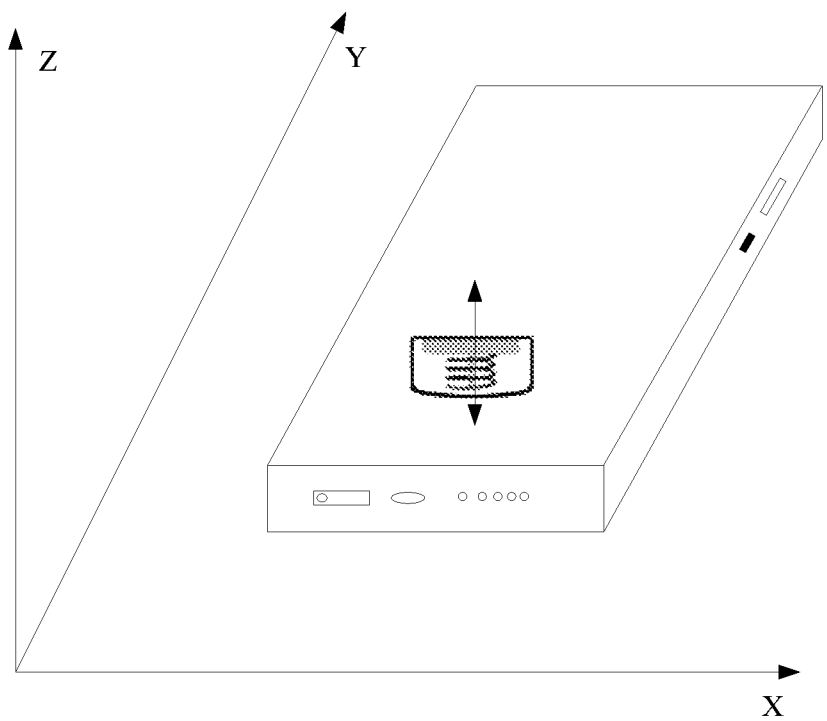
FIG. 1b is a diagram of the structure and an application example of a Z-axis linear motor.

Linear motors commonly used in an electronic device include an X-axis linear motor (also referred to as a square or a horizontal linear motor) and a Z-axis linear motor (also referred to as a circular or a vertical linear motor). FIG. 1a shows the structure and an application example of an X-axis linear motor. FIG. 1b shows the structure and an application example of a Z-axis linear motor.

As shown in FIG. 1a, an appearance of the X-axis linear motor is in a shape of a strip or a square. Assuming that an X-axis is a horizontal axis, a Y-axis is a vertical axis, and a Z-axis is a vertical axis perpendicular to the X-axis and the Y-axis, according to a placement direction, a rotor of the X-axis linear motor can move in an X-axis direction or a Y-axis direction to achieve a longer stroke. If the X-axis linear motor is mounted in the X-axis direction in an electronic device, the X-axis linear motor can provide a vibration sensation in the X-axis direction, and if the X-axis linear motor is mounted in the Y-axis direction, the X-axis linear motor can provide a vibration sensation in the Y-axis direction.

As shown in FIG. 1b, the appearance of the Z-axis linear motor is cylindrical, and the rotor can move in a Z-axis direction. The Z-axis linear motor is arranged in the electronic device, and can provide a vibration sensation in a thickness direction of the electronic device.

To achieve stronger functions and better user experience, the vibration of a linear motor may be designed for different service scenarios of an electronic device. For example, when a mobile phone is playing music, the linear motor vibrates with the rhythm of the music. However, different services of the electronic device may overlap with each other. For example, information is received when the mobile phone is playing music. That is, a music playing service overlaps with an information service. In a case that different services of the electronic device overlap with each other, the vibration of the linear motor in a service scenario may cause interference with other services. Continuing with the previous example, in a case that the user is viewing information, the mobile phone still plays music, and the linear motor is still controlled to vibrate with the music. As a result, the vibration causes interference with the user during viewing the information.

Specifically, assuming that a second event (such as an SMS application) is triggered (such as receiving an SMS message) in a process that the electronic device executes a program that implements a first event (such as audio playing), the program that implements the first event is suspended, and the program that implements the second event is executed, and the program that implements the first event continues to be executed after the second event is completed. Alternatively, the first event and the second event are simultaneously executed. That is, the program that implements the first event and the program that implements the second event are executed in parallel.

Simply put, an interruption refers to that the execution of an event is interrupted, or an event that needs to be executed in parallel is added in a process of executing an event.

An interruption event refers to an event that interrupts an execution, or an event that is added while another event is being executed and needs to be executed in parallel with the another event.

It can be seen that a vibration that is originally designed for a service scenario to improve user experience may degrade user experience under certain circumstances. It can be seen that the vibration function of the electronic device needs to be further improved. To improve the vibration function of the electronic device and avoid the possibility of reducing the user experience, the embodiments of this application provide an adjustment method and apparatus for a driving waveform.

The adjustment method for a driving waveform disclosed in the embodiment of this application is applicable to the electronic device in which the linear motor is arranged. The electronic device in which the linear motor is arranged may be a device such as a mobile phone, a tablet computer, a desktop computer, a laptop computer, a notebook computer, an ultra-mobile personal computer (Ultra-Mobile Personal Computer, UMPC), a handheld computer, a netbook, a personal digital assistant (Personal Digital Assistant, PDA), a wearable electronic device, a smartwatch, or the like.

Figure 2:
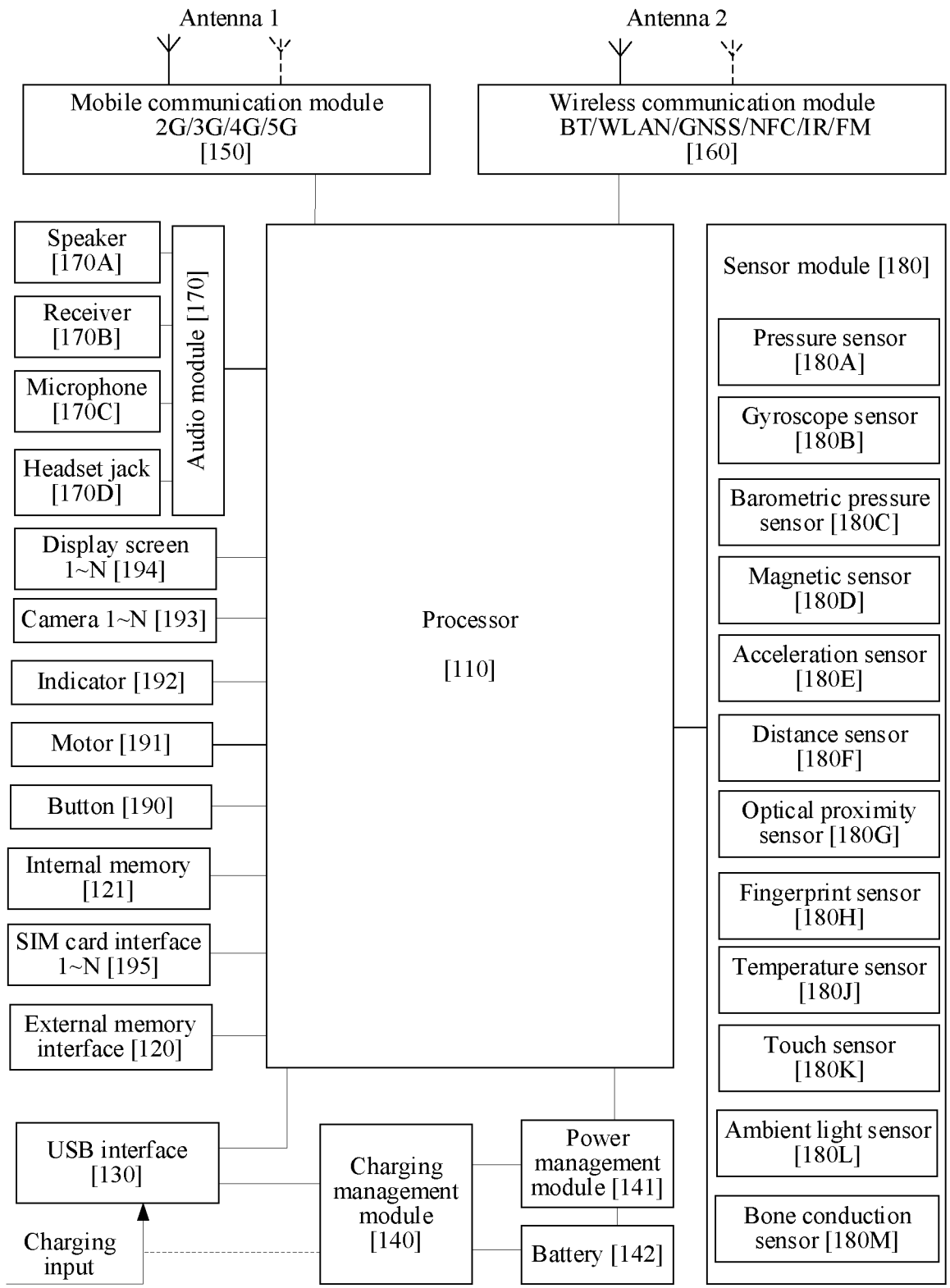
FIG. 2 is a schematic structural diagram of an electronic device according to an embodiment of this application.

The electronic device shown in FIG. 2 includes a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the electronic device. The controller may generate an operating control signal according to an instruction operation code and a sequence signal, to complete control of fetching and executing an instruction.

A memory may be further disposed in the processor 110, and is configured to store instructions and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement the function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is generally used to connect the processor 110 with the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement the function of playing music by using a Bluetooth headset.

The MIPI interface may be configured to connect the processor 110 to a peripheral device such as the display screen 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device. The processor 110 communicates with the display screen 194 by using a DSI interface, to implement a display function of the electronic device.

The GPIO interface may be configured through software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, an MIPI interface, and the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device, or may be used for data transmission between the electronic device and a peripheral device. The USB interface may also be connected to a headset to play audios through the headset. The interface may alternatively be configured to connect to another electronic device such as an AR device.

It may be understood that a schematic interface connection relationship between the modules in this embodiment is merely an example for description, and constitutes no limitation on the structure of the electronic device. In some other embodiments of this application, the electronic device may alternatively use an interface connection manner different from that in the foregoing embodiment, or use a combination of a plurality of interface connection manners.

The charging management module 140 is configured to receive a charging input from a charger. The charger may be a wireless charger or may be a wired charger. In some embodiments of wired charging, the charging management module 140 may receive charging input of a wired charger by using the USB interface 130. In some embodiments of wireless charging, the charging management module 140 may receive a wireless charging input through a wireless charging coil of the electronic device. When charging the battery 142, the charging management module 140 may further supply power to the electronic device through the power management module 141.

The power management module 141 is configured to connect to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in a same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applicable to the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker 170A, the telephone receiver 170B, and the like), or displays an image or a video through the display screen 194. In some embodiments, the modem processor may be an independent device. In some other embodiments, the modem processor may be independent of the processor 110, and the modem processor and the mobile communication module 150 or another function module may be disposed in a same component.

The wireless communication module 160 may provide a solution to wireless communication applicable to the electronic device, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components into which at least one communication processing module is integrated. The wireless communication module 160 receives an electromagnetic wave by using the antenna 2, performs frequency modulation and filtering on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, the antenna 1 and the mobile communication module 150 of the electronic device are coupled, and the antenna 2 and the wireless communication module 160 of the electronic device are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), and a Beidou navigation satellite system (Beidou navigation satellite system, BDS), a quasi-zenith satellite system (quasi-zenith satellite system, QZSS) and/or a satellite based augmentation system (satellite based augmentation system, SBAS).

The electronic device implements a display function by using the GPU, the display screen 194, the application processor, and the like. The GPU is a microprocessor for image processing, and is connected to the display screen 194 and the application processor. The GPU is configured to perform mathematical and geometric calculations and to render graphics. The processor 110 may include one or more GPUs and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device may include one or N display screens 194. N is a positive integer greater than 1.

A series of graphical user interfaces (graphical user interface, GUI) may be displayed on the display screen 194 of the electronic device, and these GUIs are main screens of the electronic device. Generally, a size of the display screen 194 of the electronic device is fixed, and only limited controls can be displayed in the display screen 194 of the electronic device. A control is a GUI element, which is a software component included in an application, and the control controls all data that the application handles and interaction operation about the data. The user can interact with the control through direct manipulation (direct manipulation) to read or edit information about the application. Generally, the control may include visual interface elements such as an icon, a button, a menu, a tab, a text box, a dialog box, a status bar, a navigation bar, and a widget. For example, in this embodiment of this application, the display screen 194 may display a virtual key.

The electronic device can implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a shooting scene. In some embodiments, the ISP may be disposed in the camera 193.

The camera 193 is configured to capture a static image or a video. An optical image of an object is generated through a lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device may include one or N cameras 193, and N is a positive integer greater than 1.

The digital signal processor is configured to process a digital signal, and in addition to a digital image signal, may further process another digital signal. For example, when the electronic device performs frequency selection, the digital signal processor is configured to perform Fourier transform and the like on frequency energy.

The video codec is configured to compress or decompress a digital video. The electronic device may support one or more video codecs. In this way, the electronic device may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device, for example, image recognition, facial recognition, voice recognition, and text understanding.

The external memory interface 120 may be configured to connect to an external storage card such as a micro SD card, to expand a storage capability of the electronic device. The external storage card communicates with the processor 110 by using the external memory interface 120, so as to implement a data storage function, such as storing a file such as music or a video in the external storage card.

The electronic device may implement an audio function by using the audio module 170, the speaker 170A, the telephone receiver 170B, the microphone 170C, the headset jack 170D, the application processor, and the like, such as music playing or recording.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device may be used to listen to music or answer a call in a hands-free mode by using the speaker 170A.

The telephone receiver 170B, also referred to as a "receiver", is configured to convert an audio electrical signal into a sound signal. When the electronic device is used to answer a call or receive voice information, the telephone receiver 170B may be put close to a human ear, to receive the voice information.

The microphone 170C, also referred to as a "microphone" or a "microphone", is configured to convert a sound signal into an electrical signal. When making a call or sending voice information, a user may speak with the mouth approaching the microphone 170C, to input a sound signal to the microphone 170C. At least one microphone 170C may be disposed in the electronic device. In some other embodiments, two microphones 170C may be disposed in the electronic device, to collect a sound signal and implement a noise reduction function. In some other embodiments, three, four, or more microphones 170C may be alternatively disposed in the electronic device, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The electronic device determines strength of pressure based on a change of the capacitance. When a touch operation is performed on the display screen 194, the electronic device detects strength of the touch operation by using the pressure sensor 180A. The electronic device may further calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device. In some embodiments, angular velocities of the electronic device around three axes (that is, an x axis, a y axis, and a z axis) may be determined through the gyroscope sensor 180B. The gyroscope sensor 180B may be used for image stabilization during photographing. For example, when the shutter is pressed, the gyro sensor 180B detects an angle at which the electronic device jitters, and calculates, based on the angle, a distance for which a lens module needs to compensate, and allows the lens to cancel the jitter of the electronic device through reverse motion, thereby implementing image stabilization. The gyroscope sensor 180B may also be used in navigation and a motion sensing game scene.

The barometric pressure sensor 180C is configured to measure barometric pressure. In some embodiments, the electronic device calculates an altitude by using a barometric pressure value measured by the barometric pressure sensor 180C, to assist in positioning and navigation.

The magnetic sensor 180D includes a Hall effect sensor. The electronic device may detect opening and closing of a flip cover or a leather case by using the magnetic sensor 180D. In some embodiments, when the electronic device is a clamshell phone, the electronic device may detect opening and closing of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect magnitudes of acceleration of the electronic device in various directions (generally on three axes). When the electronic device is stationary, a magnitude and a direction of a gravity may be detected. The acceleration sensor may be further configured to recognize a posture of the electronic device, and is applicable to switching between landscape orientation and portrait orientation, and applicable to an application such as a pedometer.

The distance sensor 180F is configured to measure a distance. The electronic device may measure a distance through infrared or laser. In some embodiments, in a photographing scene, the electronic device may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The electronic device may emit infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that a user holds the electronic device close to an ear for a call, so that automatic screen-off is implemented to achieve power saving. The optical proximity sensor 180G may be further configured to automatically unlock and lock the screen in a leather cover mode and a pocket mode.

The ambient light sensor 180L is configured to sense luminance of ambient light. The electronic device may adaptively adjust a luminance of the display screen 194 according to perceived brightness of the ambient light. The ambient light sensor 180L may be further configured to automatically adjust white balance during photo taking. The ambient light sensor 180L may further cooperate with the optical proximity sensor 180G to detect whether the electronic device is in a pocket, so as to prevent an accidental touch.

The fingerprint sensor 180H is configured to collect a fingerprint. The electronic device may implement fingerprint unlock, application lock accessing, fingerprint photographing, fingerprint-based call answering, and the like by using a feature of the collected fingerprint.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch control device". The touch sensor 180K may be disposed on the display screen 194. The touch sensor 180K and the display screen 194 form a touchscreen, which is also referred to as a "touch control screen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation by using the display screen 194. In some other embodiments, the touch sensor 180K may be alternatively disposed on a surface of the electronic device, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may obtain a voice signal through parsing based on the vibration signal, of the vibration bone of the vocal-cord part, that is obtained by the bone conduction sensor 180M, to implement a voice function. The application processor may parse heart rate information based on the blood pressure pulse signal obtained by the bone conduction sensor 180M, to implement a heart rate detection function.

A key 190 includes a power key, a volume key, and the like. The key 190 may be a mechanical key, or a touch-type key. The electronic device may receive a key input, and generate a key signal input related to user setting and function control of the electronic device.

The indicator 192 may be an indicator light, may be configured to indicate a charging state and a battery change, and may be further configured to indicate a message, a missed call, a notification, and the like.

The SIM card interface 195 is configured to connect to a SIM card. The SIM card may be inserted into the SIM card interface 195 or unplugged from the SIM card interface 195, to come into contact with or be separated from the electronic device. The electronic device may support one or N SIM card interfaces, and N is a positive integer greater than 1. The SIM card interface 195 may support a Nano SIM card, a Micro SIM card, a SIM card, and the like. A plurality of cards may be simultaneously inserted into the same SIM card interface 195. Types of the plurality of cards may be the same or different. The SIM card interface 195 may also be compatible with different types of SIM cards. The SIM card interface 195 may also be compatible with an external storage card. The electronic device interacts with the network by the SIM card to implement functions such as call and data communication. In some embodiments, the electronic device uses an eSIM, that is, an embedded SIM card. The eSIM card may be embedded in the electronic device and cannot be separated from the electronic device.

The motor 191 includes at least one of the linear motors shown in FIG. 1a and FIG. 1b.

The internal memory 121 may be configured to store computer executable program code, and the executable program code includes an instruction. The processor 110 runs the instruction stored in the internal memory 121, to perform various function applications and data processing of the electronic device. For example, in this embodiment, the processor 110 can adjust a driving waveform by executing the instruction, apparatus or module stored in the internal memory 121.

The internal memory 121 may include a program storage region and a data storage region. The program storage region may store an operating system, an application required by at least one function (for example, a voice playing function or an image playing function), and the like. The data storage region may store data (for example, audio data and an address book) and the like created when the electronic device is used. In addition, the internal memory 121 may include a high-speed random access memory, or may include a non-volatile memory such as at least one magnetic disk memory, a flash memory, or a universal flash storage (universal flash storage, UFS). The processor 110 runs the instructions stored in the internal memory 121, and/or the instructions stored in the memory arranged in the processor to perform various function applications and data processing of the electronic device.

Figure 3A:
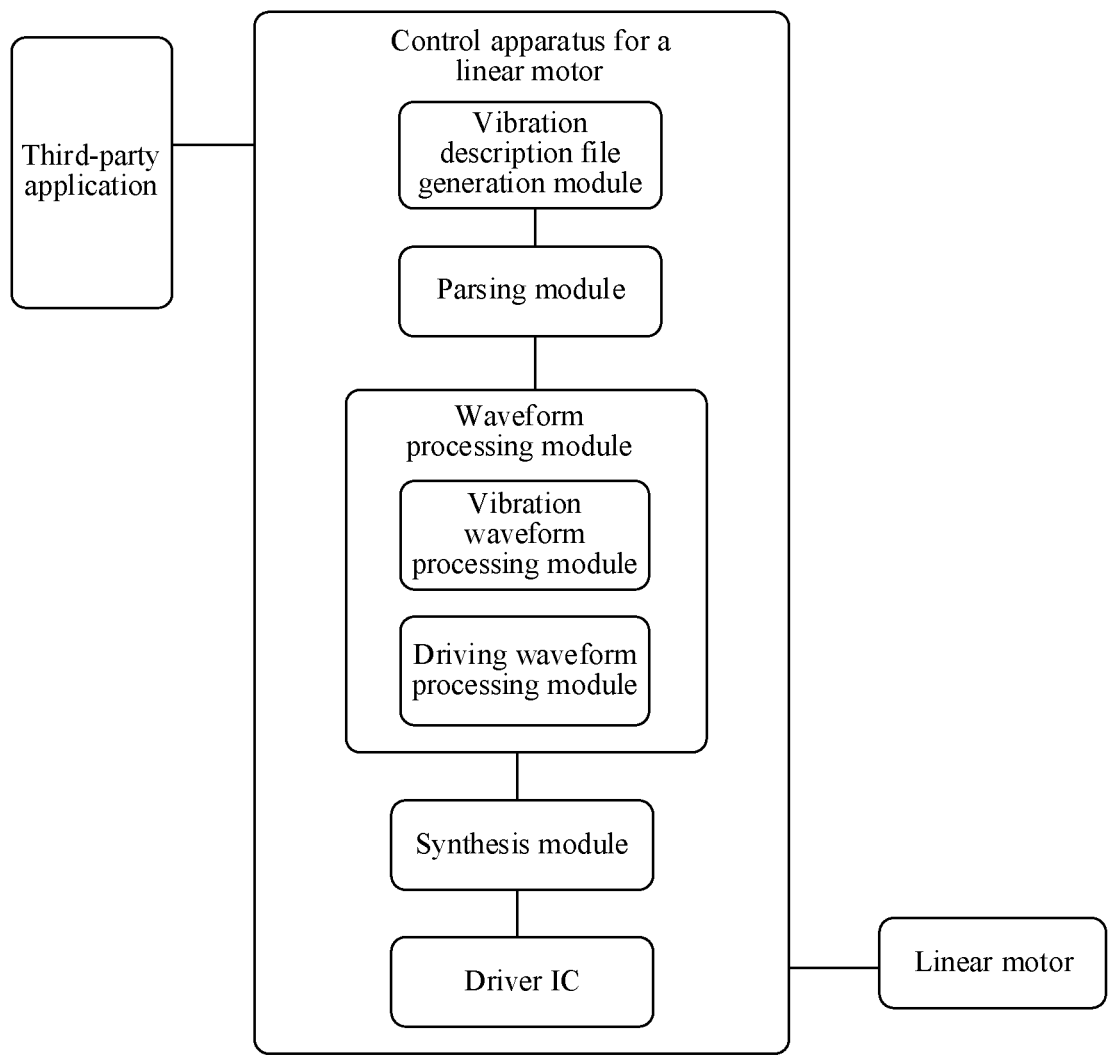
FIG. 3a is an example diagram of a software architecture applicable to an adjustment method for a vibration waveform of a linear motor according to an embodiment of this application.
Figure 3B:
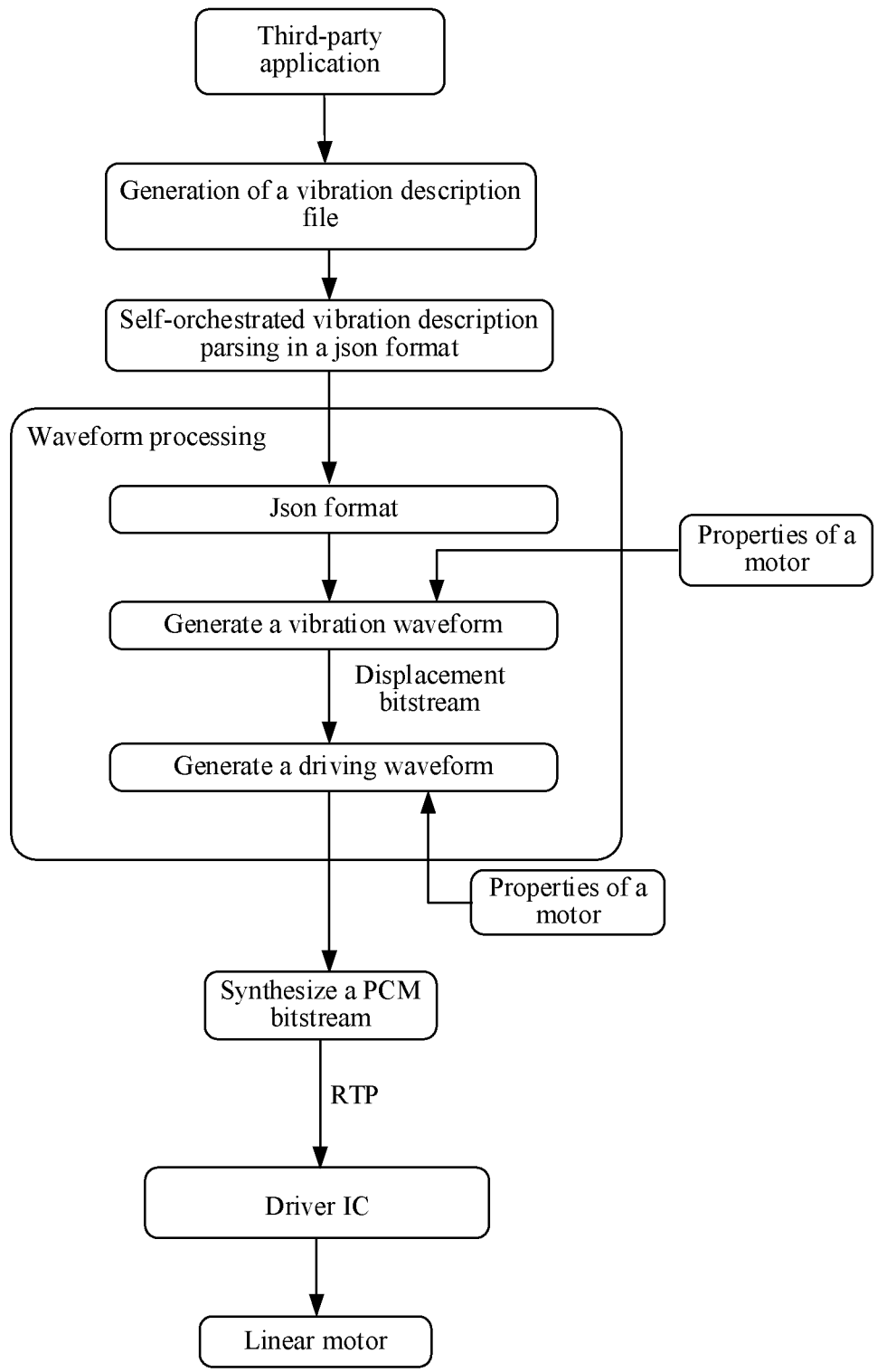

Further, FIG. 3a shows an example of a software architecture applicable to the technical solution disclosed in the embodiment of this application, and it can be known with reference to the content of FIG. 3b that:

A vibration description file generation module (which can interact with a third-party application) is configured to generate a vibration description file. A parsing module parses the vibration description file to obtain a json format file for describing a vibration waveform, and a waveform processing module performs a waveform processing operation on the json format file. Specifically, a vibration waveform processing module first performs calculation by using a synthetic motor displacement algorithm, and generates a vibration waveform in the form of a displacement bitstream according to the json format file and properties of the motor. A driving waveform processing module then performs an inverse solution calculation on the vibration waveform and the properties of the motor by using an inverse solution motor voltage driving algorithm to obtain the driving waveform.

A synthesis module synthesizes the driving waveform obtained after the waveform processing module performs the waveform processing operation to obtain an audio bitstream in a format such as Pulse Code Modulation (Pulse Code Modulation, PCM) to transmit the audio bitstream by using a protocol such as a Real-time Transport Protocol (Real-time Transport Protocol, RTP) to a driving integrated circuit (Integrated Circuit, IC), and finally acts on the linear motor to control the operation of the linear motor.

With reference to the structure of the electronic device, the software architecture shown in FIG. 3a can be stored in the internal memory 121, and the processor 110 invokes the procedure described in FIG. 3b.

The adjustment method for a driving waveform described in the embodiment of this application is applicable to the driving waveform processing module in FIG. 3a. Further, cooperation of a vibration description file generation module is further required.

The adjustment method for a driving waveform described in the embodiments of this application is described in detail below.

Figure 4A:
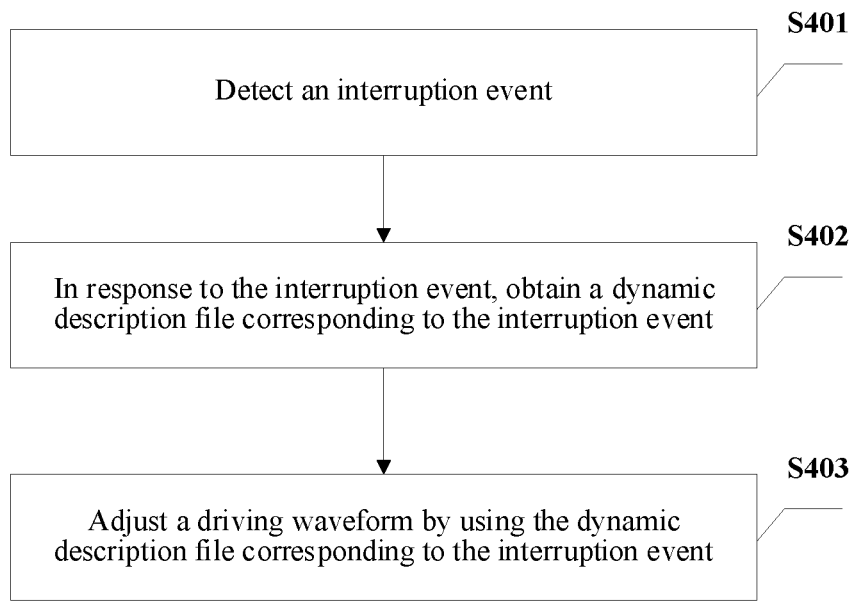
FIG. 4a is a flowchart of an adjustment method for a driving waveform according to an embodiment of this application.
Figure 4B:
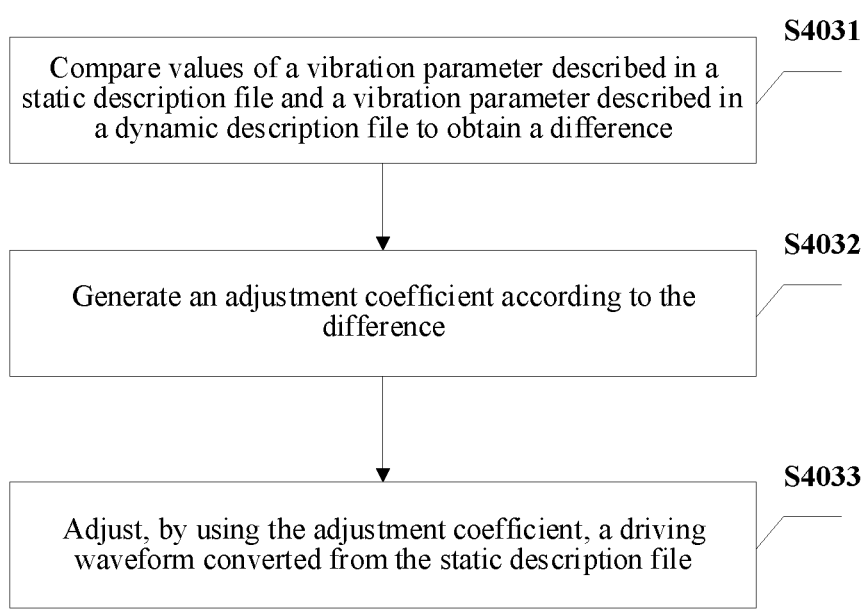
FIG. 4b is a specific flowchart of adjusting a driving waveform in an adjustment method for a driving waveform according to an embodiment of this application.

FIG. 4a shows an adjustment method for a driving waveform according to an embodiment of this application, including the following steps:

S401. Detect an interruption event.

Information such as an identifier of the interruption event that needs to be monitored may be pre-configured as required. After the information of the interruption event is detected, it is determined that the interruption event is detected.

S402. In response to the interruption event, obtain a dynamic description file corresponding to the interruption event.

A vibration description file is used for describing a vibration parameter of a vibration waveform, for example, a frequency and an amplitude of the vibration waveform. The dynamic description file refers to the vibration description file that describes the vibration parameter that controls the vibration of the linear motor during the interruption event.

The static description file corresponds to the dynamic description file, and the static description file refers to the vibration description file that describes the vibration parameter that controls the vibration of the linear motor when the interruption event does not occur.

That is, the vibration of a linear motor is controlled by using a static description file in a case that an interruption event does not occur. During the interruption event, the dynamic description file is used to control the vibration of the linear motor, so as to reduce the interference of the vibration of the linear motor to the interruption event.

In this embodiment, for example, the interruption event is that an SMS application receives an SMS message, and the interrupted event is playing music.

A correspondence between the interruption event and the dynamic description file may be pre-configured. For example, an identifier of the corresponding interruption event is written in the dynamic description file.

Optionally, the dynamic description file may be pre-configured, and is obtained from the storage space in the step, or, in response to the interruption event, a dynamic description file corresponding to the interruption event is generated. The generation method for a dynamic description file is described in the following embodiments.

S403. Adjust a driving waveform by using the dynamic description file corresponding to the interruption event.

As described above, both the dynamic description file and the static description file describe vibration parameters such as an amplitude and a frequency. In addition, the function of the dynamic description file is to reduce the interference of the vibration of the linear motor to the interruption event. Therefore, it may be understood that, among the vibration parameters described in the dynamic description file, a value of at least one vibration parameter is less than a value of the vibration parameter in the static description file.

For example, an amplitude of a transient waveform 01 described in the static description file is 0.9, an amplitude of a transient waveform 02 described in the dynamic description file is 0.3, and a frequency of the transient waveform 01 described in the static description file is the same as a frequency of the transient waveform 02 described in the dynamic description file.

Therefore, specific implementation steps of S403 are as follows:

S4031. Compare values of a vibration parameter described in a static description file and a vibration parameter described in a dynamic description file to obtain a difference.

For example, values of an amplitude value described in a static description file and an amplitude value described in a dynamic description file are sequentially compared to obtain a difference. It may be understood that the to-be-compared parameters may be pre-configured, and only parameters such as amplitudes that have a relatively large impact on the vibration sensation are compared, so as to reduce the amount of calculation.

A specific obtaining process of the static description file is described in the following embodiments.

It may be understood that the vibration parameter described in the static description file may be the same as or different from the vibration parameter described in the dynamic description file.

Further, a type of the vibration parameter described in the dynamic description file is a subset of a type of the vibration parameter described in the static description file. That is, because the dynamic description file is used when an interruption event occurs, in combination with the foregoing application scenarios, it is possible that not all parameters of the driving waveform need to be adjusted, but parameters that are strongly related to the vibration sensation need to be adjusted. Therefore, the dynamic description file may only describe parameters that are strongly related to the vibration sensation. As a result, types of parameters described in the dynamic description file may be fewer than types described in the static description file.

For example, the static description file that controls the linear motor to vibrate with the music being played includes parameters such as an amplitude, a frequency, and a vibration time. In a process that the SMS application is executed, only the amplitude is included in the static description file that controls the vibration of the linear motor. When two files are compared, only values of the amplitudes need to be compared to reduce the cost of comparison (including a user-perceivable delay).

It may be understood that a difference refers to the difference between values of the same type of parameters.

S4032. Generate an adjustment coefficient according to the difference.

For example, an amplitude adjustment coefficient is generated according to a difference between values of the amplitude described in the static description file and the amplitude described in the dynamic description file.

S4033. Adjust, by using the adjustment coefficient, a driving waveform converted from the static description file.

For example, the amplitude of the driving waveform converted from the static description file is adjusted by using the amplitude adjustment coefficient. Further, for example, if the amplitude adjustment coefficient is 0.3, the amplitude of the driving waveform is multiplied by 0.3 to obtain the adjusted amplitude.

A scenario in which information is received while the mobile phone is playing music is used as an example. After the information application receives an SMS message, the electronic device adjusts the driving waveform, for example, multiplies the amplitude of the driving waveform by an adjustment coefficient of 0.3, so that the intensity of the vibration of the driving waveform with the music is reduced, thereby reducing the interference with the user during viewing of the SMS message.

It may be understood that, optionally, the driving waveform is adjusted by using the dynamic description file during the interruption event. After the interruption event ends, the adjustment of the driving waveform is stopped according to the dynamic description file, and the vibration waveform described in the static description file is further converted into a driving waveform, and then the linear motor is driven by using the driving waveform.

In summary, in combination with the foregoing scenario examples, in a process of playing music without receiving information, the vibration waveform described in the static description file is converted into the driving waveform, and then the driving waveform is used to control the vibration of the linear motor, so that the linear motor vibrates with the music. After the information is received, the driving waveform is adjusted by using the vibration waveform described in the dynamic description file, so that the amplitude of the driving waveform is reduced. In a case that the user is viewing the information, the amplitude of the linear motor is reduced, so the interference with the user can be reduced.

It can be seen that in the adjustment method for a driving waveform described in this embodiment, in response to an interruption event, the dynamic description file is used to adjust the driving waveform to cause vibration of the linear motor to be adapted to the interruption event, so that a vibration sensation is adjusted following scenario changes, thereby providing the user with better vibration sensation experience. In addition, a vibration function is further expanded.

As described above, both the static description file and the dynamic description file may be pre-configured in the storage space and can be read from the storage space and used by the driving waveform processing module shown in FIG. 1a, or generated by the driving waveform processing module shown in FIG. 1a.

Figure 5A:
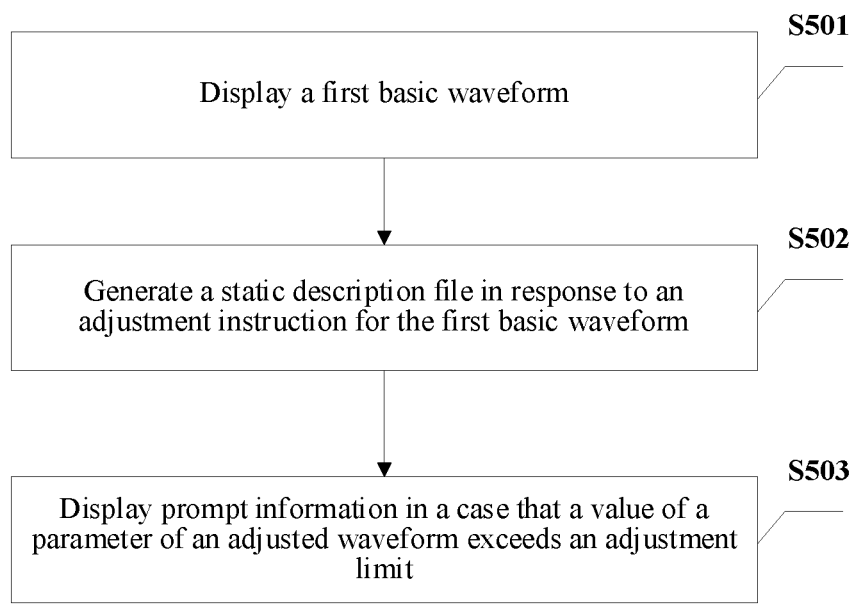
FIG. 5a is a flowchart of a generation method for a static description file according to an embodiment of this application.

FIG. 5a is a flowchart of a generation method for a static description file, including the following steps:

S501. Display a first basic waveform.

A first interface may be presented, and the first interface displays a first basic waveform.

The first basic waveform is a waveform obtained according to the characteristics of an object to which the vibration is to be applied, or a waveform selected from a pre-configured scenario vibration sensation library.

Figure 5B:
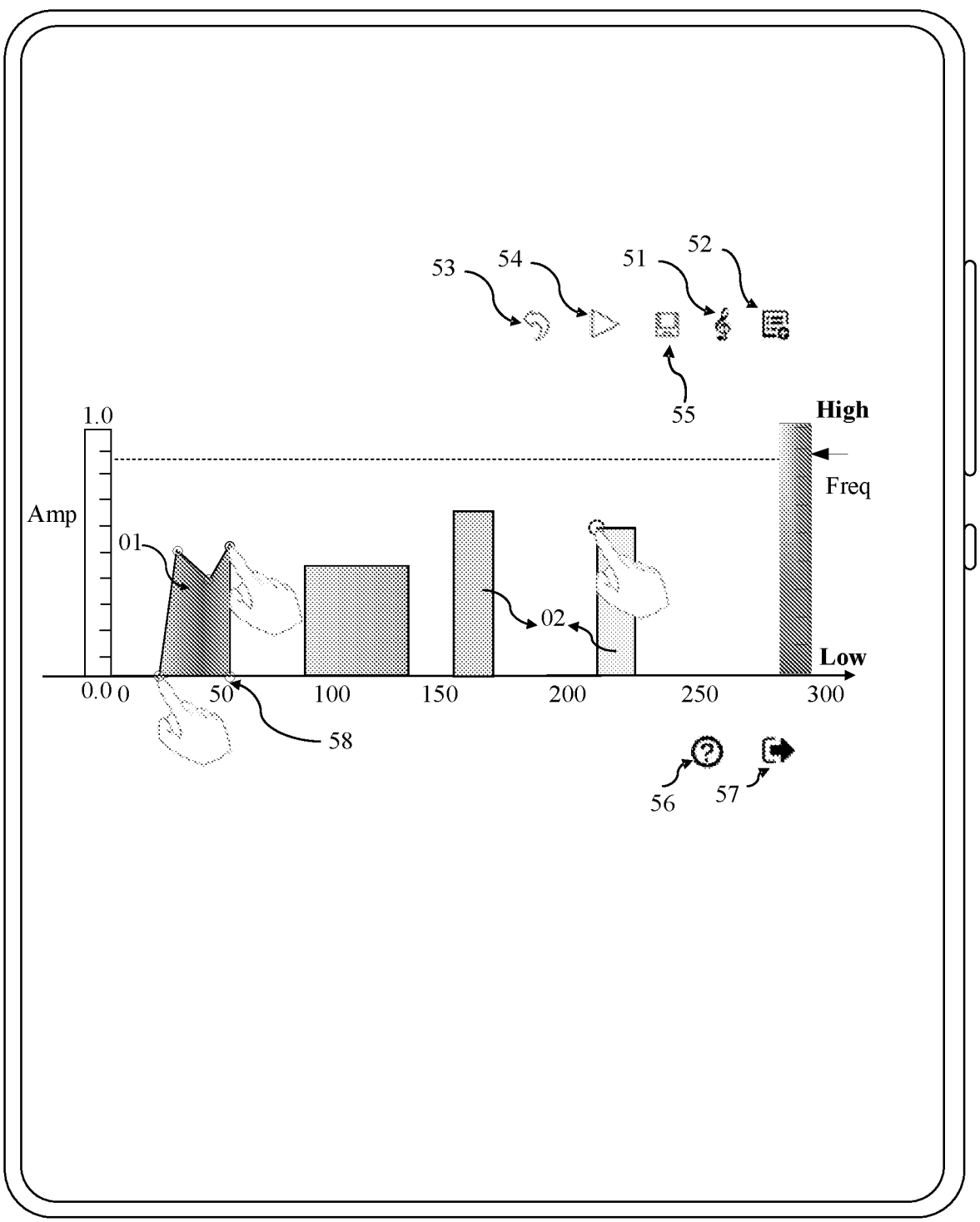
FIG. 5b is an example diagram of an interaction interface for a user to generate a static description file according to an embodiment of this application.

Specifically, the object to which the vibration is to be applied may be audio, and a basic waveform is generated according to the sound effect characteristics such as an envelope, a frequency, an amplitude, a timbre, and a rhythm of the audio. It may be understood that the object to which the vibration is to be applied may be received from the outside, for example, an audio file imported by a user. As shown in an interaction interface shown in FIG. 5b, the user may click a musical note icon 51 at an upper right corner of the interaction interface to import an audio file, and the interaction interface displays the basic waveform generated according to the imported audio file.

Specifically, the pre-configured scenario vibration sensation library includes waveforms corresponding to vibration sensations in various scenarios, for example, a waveform corresponding to a vibration sensation in a shooting scene (gaming), and a waveform corresponding to a vibration sensation in an explosion scene (gaming). A waveform file in the scenario vibration sensation library may be added, deleted or modified.

It may be understood that the interaction interface may be displayed, and the user may select the waveform corresponding to a vibration sensation in at least one scenario from the scenario vibration sensation library based on the interaction interface. In the interaction interface shown in FIG. 5b, the user may click a file icon 52 at the upper right corner of the interaction interface to import the waveform in the scenario vibration sensation library. The waveform selected by the user from the scenario vibration sensation library is used as the basic waveform in response to a selection instruction triggered by the user's selection operation.

S502. Generate a static description file in response to an adjustment instruction for the first basic waveform.

The adjustment instruction described in the step may instruct to adjust the parameter of the waveform. For example, vibration parameters such as a frequency, a start time, a duration, and an amplitude of a first basic waveform are adjusted. Superimposed waveforms can further be instructed. For example, first basic waveforms of different vibration events are superimposed.

A plurality of to-be-superimposed waveforms are not limited to events. For a specific calculation manner of waveform superimposition, reference may be made to the related art. For example, values of different amplitudes are added, and details are not described herein again. The objective of the waveform superimposition is to expand a plurality of vibration effects by superimposing and presenting, which can support the superimposition of vibration effects in a plurality of scenarios, so that the user's vibration experience is richer.

The basic waveform is adjusted in response to the adjustment instruction, and a vibration description file is generated in response to an instruction sent by a save control 55. Optionally, the adjusted waveform, that is, the waveform described in the vibration description file, may further be displayed on the interaction interface in response to the instruction sent by the save control 55.

S503. Display prompt information in a case that a value of a parameter of an adjusted waveform exceeds an adjustment limit.

The prompt information is used for indicating that the adjustment exceeds the adjustment limit.

Optionally, the adjustment instruction is not responded in a case that a value of the parameter of the adjusted waveform exceeds the adjustment limit.

Specifically, the adjustment limit may include, but is not limited to, an amplitude limit, a start time limit, and a stop time limit.

The amplitude limit may be determined according to a maximum displacement of the to-be-controlled linear motor. The start time limit and the stop time limit may be determined according to the properties of the to-be-controlled linear motor.

The objective of setting the adjustment limit is to protect the to-be-controlled linear motor from damage.

Compared with a manner in the related art in which a person of skill writes code to form the vibration description file, the obtaining efficiency of the vibration description file can be improved, and a technical threshold for the user to obtain the vibration description file can be lowered. Because a basic waveform is provided first, the user can obtain the required vibration description file based on the basic waveform, so that the efficiency is further improved and a technical threshold for the user to obtain the vibration description file is lowered.

A difference between the generation process of the dynamic description file and the process shown in FIG. 5a is that, to distinguish the basic waveform from the static description file, the basic waveform is referred to as a second basic waveform herein, which is received from an external source. Specifically, the external source may provide a source device for waveforms such as an application and a device. Other steps are the same as the procedure shown in FIG. 5a, and details are not described herein again. The dynamic description file may also be visualized and adjusted, so that greater possibility and flexibility for subsequent dynamic adjustment of the vibration of the linear motor are provided.

It should be noted that, in the foregoing embodiments, the interaction interface is only an implementation, which has higher convenience and better user experience, but an adjustment manner for a basic waveform is not limited to implementations based on the interaction interface.

Figure 6:
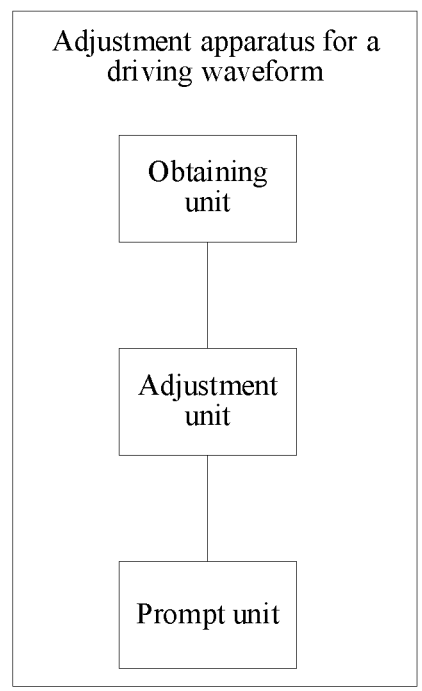
FIG. 6 is a schematic structural diagram of an adjustment apparatus for a driving waveform according to an embodiment of this application.

FIG. 6 is a schematic structural diagram of an adjustment apparatus for a driving waveform according to an embodiment of this application, including an obtaining unit and an adjustment unit. Optionally, the apparatus may further include a prompt unit.

The obtaining unit is configured to obtain, in response to an interruption event, a vibration description file corresponding to the interruption event, the vibration description file being used for describing the vibration parameter. The adjustment unit is configured to adjust a driving waveform by using the vibration parameter. The prompt unit is configured to display prompt information in a case that a value of the parameter of the adjusted waveform exceeds an adjustment limit, the prompt information being used for prompting that an adjustment exceeds the adjustment limit.

Optionally, a specific implementation in which the adjustment unit is configured to adjust a driving waveform by using the vibration parameter is: comparing values of a vibration parameter described in a static description file and a vibration parameter described in a dynamic description file to obtain a difference, where in a case that the interruption event does not occur, the static description file being used for controlling the linear motor to vibrate, the dynamic description file being the vibration description file corresponding to the interruption event: and generating an adjustment coefficient according to the difference: and adjusting, by using the adjustment coefficient, a driving waveform converted from the static description file, so that the adjustment accuracy is high and operations are facilitated.

Optionally, a type of the vibration parameter described in the dynamic description file is a subset of a type of the vibration parameter described in the static description file to reduce the cost of comparison.

Optionally, the obtaining unit is further configured to: obtain a waveform according to vibration characteristics of an application, or select a waveform from a pre-configured scenario vibration sensation waveform to display a first basic waveform; and generate the static description file in response to an adjustment instruction for the first basic waveform, so that the efficiency can be improved and a technical threshold for the user to obtain the vibration description file is lowered.

Optionally, a specific implementation in which the obtaining unit is configured to obtain the vibration description file corresponding to the interruption event is: receiving and displaying a second basic waveform from an external source; and generating the vibration description file corresponding to the interruption event in response to an adjustment instruction for the second basic waveform. The dynamic description file may also be visualized and adjusted, so that greater possibility and flexibility for subsequent dynamic adjustment of the vibration of the linear motor are provided.

Optionally, the adjustment instruction instructs to perform at least one of adjusting a parameter of the waveform or superimposing of a plurality of waveforms.

The adjustment apparatus for a driving waveform shown in FIG. 6 can not only expand the vibration function, that is, the driving waveform is adjusted in response to the interruption event, so that the vibration of the motor is adapted to the interruption event, and can further improve the user experience.

An embodiment of this application further provides a readable storage medium, storing a computer program, the computer program, when executed by a processor, implementing the adjustment method for a vibration waveform of a linear motor according to the foregoing embodiments to improve the vibration effect of the linear motor.

What is claimed is:

1. An adjustment method for a driving waveform, applicable to an electronic device, the electronic device comprising a linear motor, the method comprising:
in response to an interruption event, obtaining a vibration description file corresponding to the interruption event, the description file being used for describing a vibration parameter, wherein obtaining the vibration description file comprises:
receiving and displaying a basic waveform from an external source; and
generating the vibration description file corresponding to the interruption event in response to an adjustment instruction for the basic waveform; and
adjusting a driving waveform by using the vibration parameter.

2. The adjustment method for a driving waveform according to claim 1, wherein the adjusting a driving waveform by using the vibration parameter comprises:
comparing values of a vibration parameter described in a static description file and a vibration parameter described in a dynamic description file to obtain a difference, in a case that the interruption event does not occur, the static description file being used for controlling the linear motor to vibrate, the dynamic description file being the vibration description file corresponding to the interruption event; and
generating an adjustment coefficient according to the difference; and
adjusting, by using the adjustment coefficient, a driving waveform converted from the static description file.

3. The adjustment method for the driving waveform according to claim 2, wherein a type of the vibration parameter described in the dynamic description file is a subset of a type of the vibration parameter described in the static description file.

4. The adjustment method for the driving waveform according to claim 2, wherein the basic wave form is a second basic waveform, and wherein an obtaining process of the static description file comprises:
obtaining a waveform according to vibration characteristics of an application, or selecting a waveform from a pre-configured scenario vibration sensation waveform to display a first basic waveform; and
generating the static description file in response to an adjustment instruction for the first basic waveform.

5. The adjustment method for the driving waveform according to claim 1, wherein the adjustment instruction instructs to perform at least one of adjusting a parameter of the waveform or superimposing of a plurality of waveforms.

6. The adjustment method for a driving waveform according to claim 5, the method further comprising:
displaying prompt information in a case that a value of the parameter of the adjusted waveform exceeds an adjustment limit, the prompt information being used for prompting that an adjustment exceeds the adjustment limit.

7. An adjustment apparatus for a driving waveform, applicable to an electronic device, the electronic device comprising a linear motor, the apparatus comprising:
one or more processors; and
a memory storing a non-transitory program for execution by the one or more processors to cause the apparatus to:
obtain, in response to an interruption event, a vibration description file corresponding to the interruption event, the vibration description file being used for describing a vibration parameter, wherein obtain the vibration description file comprises:
receiving and displaying a basic waveform from an external source; and
generating the vibration description file corresponding to the interruption event in response to an adjustment instruction for the basic waveform; and
adjust a driving waveform by using the vibration parameter.

8. The adjustment apparatus for a driving waveform according to claim 7, wherein that the apparatus is configured to adjust a driving waveform by using the vibration parameter comprises:
that the apparatus is further configured to compare values of a vibration parameter described in a static description file and a vibration parameter described in a dynamic description file to obtain a difference, wherein in a case that the interruption event does sot occur, the static description file being used for controlling the linear motor to vibrate, the dynamic description file being the vibration description file corresponding to the interruption event, and generating an adjustment coefficient according to the difference; and adjusting, by using the adjustment coefficient, a driving waveform converted from the static description file.

9. The adjustment apparatus for the driving waveform according to claim 8, wherein a type of the vibration parameter described in the dynamic description file is a subset of a type of the vibration parameter described in the static description file.

10. The adjustment apparatus for the driving waveform according to claim 8, wherein the basic wave form is a second basic waveform, and wherein the apparatus is further configured to: obtain a waveform according to vibration characteristics of an application, or select a waveform from a pre-configured scenario vibration sensation waveform to display a first basic waveform: and generate the static description file in response to an adjustment instruction for the first basic waveform.

11. The adjustment apparatus for the driving waveform according to claim 7, wherein the adjustment instruction instructs to perform at least one of adjusting a parameter of the waveform or superimposing of a plurality of waveforms.

12. The adjustment apparatus for the driving waveform according to claim 11, the apparatus further comprising:
a prompt unit, configured to display prompt information in a case that a value of the parameter of the adjusted waveform exceeds an adjustment limit, the prompt information being used for prompting that an adjustment exceeds the adjustment limit.

13. An electronic device, the apparatus comprising:
one or more processors; and
a memory, storing a program,
the program, when executed by the one or more processors, causing the one or more processors to implement the adjustment method, wherein the method comprising:
in response to an interruption event, obtaining a vibration description file corresponding to the interruption event, the description file being used for describing a vibration parameter, wherein obtaining the vibration description file comprises:
receiving and displaying a basic waveform from an external source; and
generating the vibration description file corresponding to the interruption event in response to an adjustment instruction for the basic waveform; and
adjusting a driving waveform by using the vibration parameter.

14. The electronic device according to claim 13, wherein the adjusting a driving waveform by using the vibration parameter comprises:
comparing values of a vibration parameter described in a static description file and a vibration parameter described in a dynamic description file to obtain a difference, in a case that the interruption event does not occur, the static description file being used for controlling the linear motor to vibrate, the dynamic description file being the vibration description file corresponding to the interruption event; and generating an adjustment coefficient according to the difference; and adjusting, by using the adjustment coefficient, a driving waveform converted from the static description file.

15. The electronic device according to claim 14, wherein a type of the vibration parameter described in the dynamic description file is a subset of a type of the vibration parameter described in the static description file.

16. The electronic device according to claim 14, wherein the basic wave form is a second basic waveform and wherein an obtaining process of the static description file comprises:

obtaining a waveform according to vibration characteristics of an application, or selecting a waveform from a pre-configured scenario vibration sensation waveform to display a first basic waveform; and generating the static description file in response to an adjustment instruction for the first basic waveform.

17. The electronic device according to claim 13, wherein the adjustment instruction instructs to perform at least one of adjusting a parameter of the waveform or superimposing of a plurality of waveforms.

* * * * *

UNITED STATES PATENT AND TRADEMARK OFFICE
CERTIFICATE OF CORRECTION

| | | |
|---|---|---|
| PATENT NO. | : 12,380,775 B2 | Page 1 of 1 |
| APPLICATION NO. | : 17/797935 | |
| DATED | : August 5, 2025 | |
| INVENTOR(S) | : Jianwei Zhu | |

It is certified that error appears in the above-identified patent and that said Letters Patent is hereby corrected as shown below:

In the Specification

In Column 1, In Line 12 (Approx.), Delete "20/211,0552996.7," and insert -- 202110552996.7, --.

In the Claims

In Column 22, In Line 11, In Claim 8, delete "sot" and insert -- not --.

In Column 22, In Line 15, In Claim 8, delete "event," and insert -- event; --.

In Column 22, In Line 30, In Claim 10, delete "waveform:" and insert -- waveform; --.

In Column 23, In Line 16, In Claim 16, after "waveform" insert -- , --.

Signed and Sealed this
Tenth Day of February, 2026

John A. Squires
*Director of the United States Patent and Trademark Office*